US011181360B2

United States Patent
Saito et al.

(10) Patent No.: US 11,181,360 B2
(45) Date of Patent: Nov. 23, 2021

(54) EVALUATING METHOD AND EVALUATION SYSTEM (71) Applicant: MITSUBISHI HEAVY INDUSTRIES, LTD., Tokyo (JP)

(72) Inventors: Nozomi Saito, Tokyo (JP); Kunihiro Morishita, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 16/765,603

(22) PCT Filed: Mar. 4, 2019

(86) PCT No.: PCT/JP2019/008355
§ 371 (c)(1),
(2) Date: May 20, 2020

(87) PCT Pub. No.: WO2019/172178
PCT Pub. Date: Sep. 12, 2019

(65) Prior Publication Data
US 2020/0309512 A1 Oct. 1, 2020

(30) Foreign Application Priority Data
Mar. 8, 2018 (JP) .............................. JP2018-042013

(51) Int. Cl.
G01B 11/16 (2006.01)
G01B 11/24 (2006.01)
G01L 1/24 (2006.01)

(52) U.S. Cl.
CPC .............. *G01B 11/16* (2013.01); *G01B 11/24* (2013.01); *G01L 1/243* (2013.01)

(58) Field of Classification Search
CPC .... G01N 33/5308; G01N 33/74; G01N 21/51; G01N 23/046; G01N 2223/419;
(Continued)

(56) References Cited

U.S. PATENT DOCUMENTS 4,936,649 A * 6/1990 Lymer ................. G01M 5/0091
156/158
2013/0341497 A1* 12/2013 Zuardy ................... G01L 1/242
250/227.14
(Continued)

FOREIGN PATENT DOCUMENTS

CN 106092160 A * 11/2016
CN 106931896 A * 7/2017
(Continued)

OTHER PUBLICATIONS

PCT/ISA/210, "International Search Report for International Application No. PCT/JP2019/008355," dated May 21, 2019.
(Continued)

*Primary Examiner* — Michael P Stafira
(74) *Attorney, Agent, or Firm* — Manabu Kanesaka; Benjamin Hauptman; Kenneth Berner (57) ABSTRACT This evaluating method is an evaluating method for evaluating an assembly (50) provided with a reinforced member (60) and a reinforcing member (70), and includes: a step of introducing incident light into a first optical fiber (20) extending between a first composite layer and a second composite layer and detecting outgoing light therefrom to measure a first strain distribution, and introducing incident light into a second optical fiber (30) extending between the second composite layer and a third composite layer and detecting outgoing light therefore to measure a second strain distribution; and a step of acquiring the shape of wrinkles at the surface (60s) of the reinforced member (60) from the first strain distribution and the second strain distribution.

7 Claims, 8 Drawing Sheets (58) Field of Classification Search
CPC ....... G01N 2223/505; G01N 33/54373; G01N 33/56972; G01N 33/82; G01N 2035/00495; G01N 2223/108; G01N 23/2255; G01N 35/10; G01N 1/4077; G01N 2001/4083; G01N 2035/1018; G01N 21/00; G01N 21/0303; G01N 21/59; G01N 2333/575; G01N 2333/62; G01N 2333/91188; G01N 2333/96463; G01N 33/54326; G01N 33/54393; G01N 33/56983; G01N 33/573; G01N 33/743; G01N 33/80; G01N 33/92; G01N 21/31; G01N 21/636; G01N 2333/726; G01N 2458/00; G01N 2500/02; G01N 2500/04; G01N 33/54313; G01N 33/56966; G01N 33/583; G01N 33/587; G01N 33/6845; G01N 23/207; G01N 11/00; G01N 15/1436; G01N 15/1459; G01N 2011/008; G01N 2021/0346; G01N 2021/4707; G01N 2021/4709; G01N 2021/513; G01N 21/03; G01N 2201/08; G01N 2223/611; G01N 15/0211; G01N 2015/0222; G01N 23/201; G01N 33/582; G01N 2035/0094; G01N 21/84; G01N 2333/75; G01N 33/4905; G01N 33/86; G01N 35/0092; G01N 15/14; G01N 15/1434; G01N 2015/0038; G01N 2015/0238; G01N 2015/025; G01N 2015/0277; G01N 2035/00881; G01N 21/25; G01N 21/4795; G01N 21/6428; G01N 21/65; G01N 21/9501; G01N 21/95623; G01N 2201/0675; G01N 2201/129; G01N 2223/302; G01N 2223/306; G01N 2223/639; G01N 2223/643; G01N 2223/645; G01N 23/04; G01N 23/203; G01N 15/0205; G01N 15/1427; G01N 15/1429; G01N 15/1456; G01N 15/1463; G01N 15/1475; G01N 15/1484; G01N 2015/0053; G01N 2015/0092; G01N 2015/1006; G01N 2015/1075; G01N 2015/1402; G01N 2015/1438; G01N 2015/1454; G01N 2021/1785; G01N 2021/479; G01N 2021/6471; G01N 2030/8447; G01N 2035/00326; G01N 21/53; G01N 21/6408; G01N 21/645; G01N 21/6458; G01N 2201/1045; G01N 23/041; G01N 23/18; G01N 23/20; G01N 23/20008; G01N 23/20016; G01N 23/20025; G01N 23/205; G01N 23/2055; G01N 30/74; G01N 33/381; G01N 33/552; G01N 33/553; G01N 35/00069; G01N 35/00871; G01N 35/026; G01N 35/1065; G01N 35/1097; G01L 1/246; G01L 1/242; G01L 1/24; G01L 11/025; G01L 5/04; G01L 9/0007; G01L 1/243; G01L 1/245; G01L 5/0047; G01L 5/166; G01L 5/0085; G01L 1/247; G01L 7/041; G01L 9/0027; G01L 5/045; G01L 5/24; G01L 1/125; G01L 25/00; G01L 3/102; G01L 3/103; G01L 3/12; G01L 1/04; G01L 1/16; G01L 1/2237; G01L 1/26; G01L 11/00; G01L 11/02; G01L 5/00; G01L 5/105; G01L 5/16; G01L 5/1627; G01L 5/243; G01B 11/18; G01B 11/16; G01B 11/165; G01B 11/24; G01B 11/00; G01B 11/161; G01B 9/02091; G01B 11/02; G01B 11/162; G01B 17/04; G01B 9/02004; G01B 9/02044; G01B 11/0625; G01B 11/2513; G01B 11/255; G01B 9/02027; G01B 9/02034; G01B 9/0205; G01B 9/02057; G01B 9/02069; G01B 9/02083; G01B 9/0209

See application file for complete search history.

(56) References Cited

U.S. PATENT DOCUMENTS

| | | | |
|---|---|---|---|
| 2016/0069793 A1 | 3/2016 | Saito et al. | |
| 2016/0216166 A1* | 7/2016 | Kwon | G01D 5/353 |
| 2017/0276648 A1* | 9/2017 | Takahashi | B64C 3/18 |
| 2018/0065725 A1* | 3/2018 | Benthien | B64C 1/061 |
| 2019/0368904 A1* | 12/2019 | Soejima | G01D 5/35316 |
| 2020/0061874 A1* | 2/2020 | Hudson | G01D 5/35383 |

FOREIGN PATENT DOCUMENTS

| | | | | |
|---|---|---|---|---|
| CN | 109696140 A | * | 4/2019 | |
| DE | 3926457 A1 | * | 4/1991 | G01L 5/105 |
| EP | 2672234 A1 | | 12/2013 | |
| EP | 3211399 A1 | * | 8/2017 | G01L 1/24 |
| WO | 2014/185119 A1 | | 11/2014 | |
| WO | WO-2016114194 A1 | * | 7/2016 | G01N 19/04 |

OTHER PUBLICATIONS

PCT/ISA/237, "Written Opinion of the International Searching Authority for International Application No. PCT/JP2019/008355," dated May 21, 2019.

* cited by examiner

EVALUATING METHOD AND EVALUATION SYSTEM

TECHNICAL FIELD

The present invention relates to an evaluating method and an evaluation system.

Priority is claimed on Japanese Patent Application No. 2018-042013 filed on Mar. 8, 2018, the content of which is incorporated herein by reference.

BACKGROUND ART

Some assemblies, such as a wing or a fuselage of an aircraft, use a resin-based composite material such as fiber reinforced plastic. For example, PTL 1 discloses an assembly using a carbon fiber reinforced plastic (hereinafter, abbreviated as "CFRP") as a composite material.

CITATION LIST

Patent Literature

[PTL 1] European Patent Application, Publication No. 2672234

SUMMARY OF INVENTION

Technical Problem

For example, in a case of assembling a wing by using the CFRP, a stringer as a reinforcing member is joined to the inner surface of a skin panel formed by laminating prepregs in which a thermosetting resin is impregnated into carbon fibers. If the stringer is joined to the inner surface of the skin panel, there is a case where wrinkles are generated in the prepreg on the inner surface of the skin panel.

In PTL 1, although a strain of the CFRP layer is monitored using an optical fiber embedded in an assembly during manufacturing, a wrinkle is not detected. For this reason, it is not possible to evaluate the wrinkles.

The present invention has an object to provide an evaluating method and an evaluation system capable of evaluating a wrinkle in order to solve the above problem.

Solution to Problem

According to a first aspect, there is provided an evaluating method for evaluating an assembly provided with a reinforced member having a first composite layer, a second composite layer, and a third composite layer in order, and a reinforcing member fixed to a surface of the reinforced member, the method including: a step of measuring a first strain distribution that is a distribution of a strain at each position in an axial direction of a first optical fiber extending between the first composite layer and the second composite layer by introducing incident light into the first optical fiber and detecting outgoing light from the first optical fiber, and measuring a second strain distribution that is a distribution of a strain at each position in an axial direction of a second optical fiber extending between the second composite layer and the third composite layer along the first optical fiber by introducing incident light into the second optical fiber and detecting outgoing light from the second optical fiber; and a step of acquiring a shape of a wrinkle on the surface of the reinforced member from the first strain distribution and the second strain distribution.

According to this aspect, the shape of the wrinkle on the surface of the reinforced member is acquired from the first strain distribution and the second strain distribution. For this reason, it is possible to evaluate the wrinkle on the surface of the reinforced member.

According to a second aspect, in the evaluating method according to the first aspect, the reinforcing member has a peripheral edge portion, and each of the first optical fiber and the second optical fiber intersects at least a part of the peripheral edge portion.

According to a third aspect, the reinforcing member is a stringer extending in one direction, and the first optical fiber and the second optical fiber intersect at least a part of an edge portion extending the one direction in the peripheral edge portion.

According to a fourth aspect, in the evaluating method according to any one of the first to third aspects, the first optical fiber and the second optical fiber meander over both sides of the reinforcing member.

According to a fifth aspect, there is provided an evaluation system that evaluates an assembly provided with a reinforced member having a first composite layer, a second composite layer, and a third composite layer in order, and a reinforcing member fixed to a surface of the reinforced member, the system including: a measurement unit that measures a first strain distribution that is a distribution of a strain at each position in an axial direction of a first optical fiber extending between the first composite layer and the second composite layer by introducing incident light into the first optical fiber and detecting outgoing light from the first optical fiber, and measures a second strain distribution that is a distribution of a strain at each position in an axial direction of a second optical fiber extending between the second composite layer and the third composite layer along the first optical fiber by introducing incident light into the second optical fiber and detecting outgoing light from the second optical fiber; and a shape acquisition unit that acquires a shape of a wrinkle on the surface of the reinforced member from the first strain distribution and the second strain distribution.

According to this aspect, the shape of the wrinkle on the surface of the reinforced member is acquired from the first strain distribution and the second strain distribution. For this reason, it is possible to evaluate the wrinkle on the surface of the reinforced member.

Advantageous Effects of Invention

According to the aspects described above, it is possible to evaluate a wrinkle.

DESCRIPTION OF EMBODIMENTS

Embodiment

Hereinafter, an evaluation system according to an embodiment of the present invention will be described with reference to FIGS. 1 to 9.

(Configuration of Evaluation System)

An evaluation system 1 is a system for evaluating an assembly 50.

Figure 1:
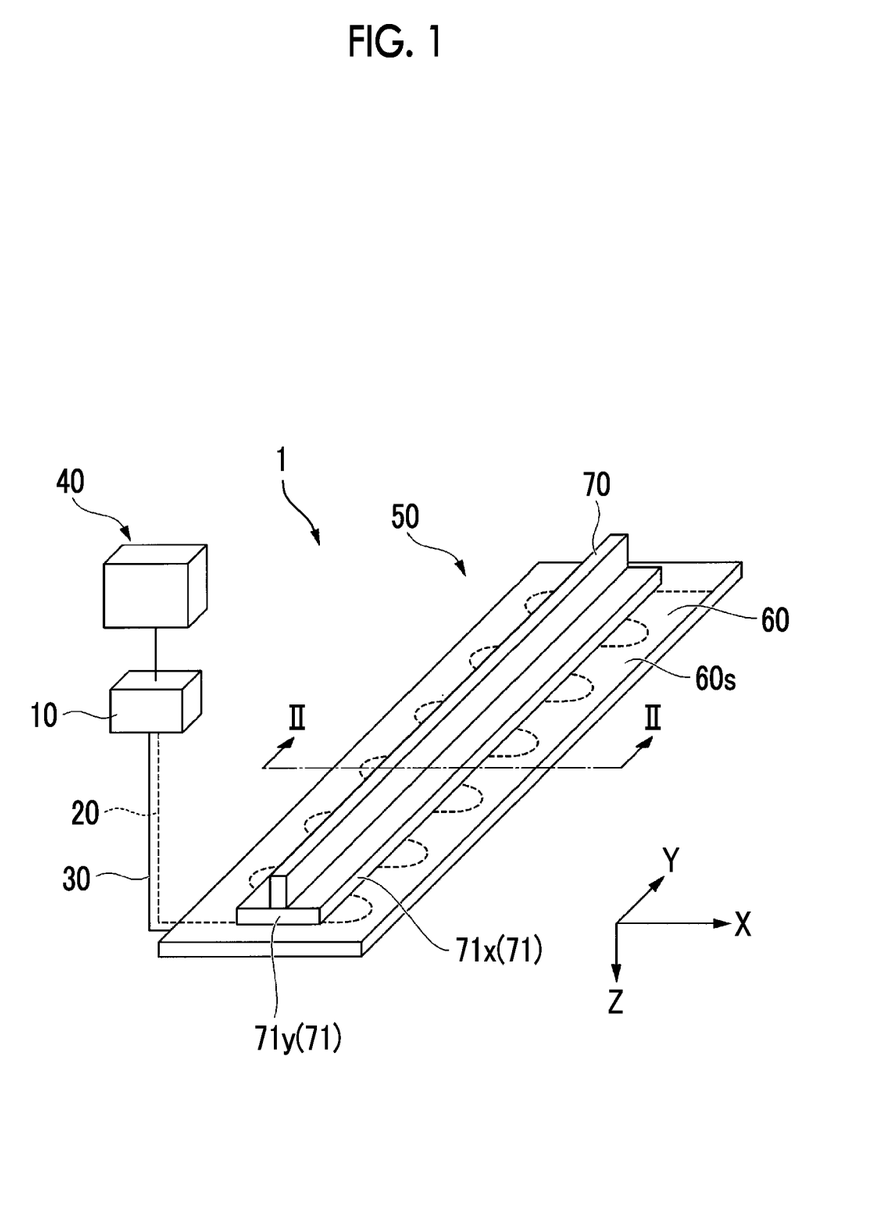
FIG. 1 is a schematic diagram of an entire evaluation system according to an embodiment.

As shown in FIG. 1, the evaluation system 1 includes a measurement unit 10, a first optical fiber 20, a second optical fiber 30, and a shape acquisition unit 40.

The first optical fiber 20 and the second optical fiber 30 are provided in the assembly 50 and receive a strain according to the internal deformation of the assembly 50.

The measurement unit 10 introduces incident light into each of the first optical fiber 20 and the second optical fiber 30 and detects outgoing light which is emitted from each of the first optical fiber 20 and the second optical fiber 30.

The measurement unit 10 can measure a first strain distribution, which is a distribution of a strain at each position in an axial direction of the first optical fiber 20, by detecting the outgoing light from the first optical fiber 20.

Similarly, the measurement unit 10 can measure a second strain distribution, which is a distribution of a strain at each position in the axial direction of the second optical fiber 30, by detecting the outgoing light from the second optical fiber 30.

The shape acquisition unit 40 is communicably connected to the measurement unit 10. The shape acquisition unit 40 acquires the measured first strain distribution and second strain distribution from the measurement unit 10. The shape acquisition unit 40 acquires the shape of a wrinkle WK on a surface 60s of a reinforced member 60 from the first strain distribution and the second strain distribution by internal calculation.

(Configuration of Assembly)

The configuration of the assembly 50 will be described in detail.

The assembly 50 includes the reinforced member 60 and a reinforcing member 70.

In this embodiment, the reinforced member 60 is a skin panel.

Figure 2:
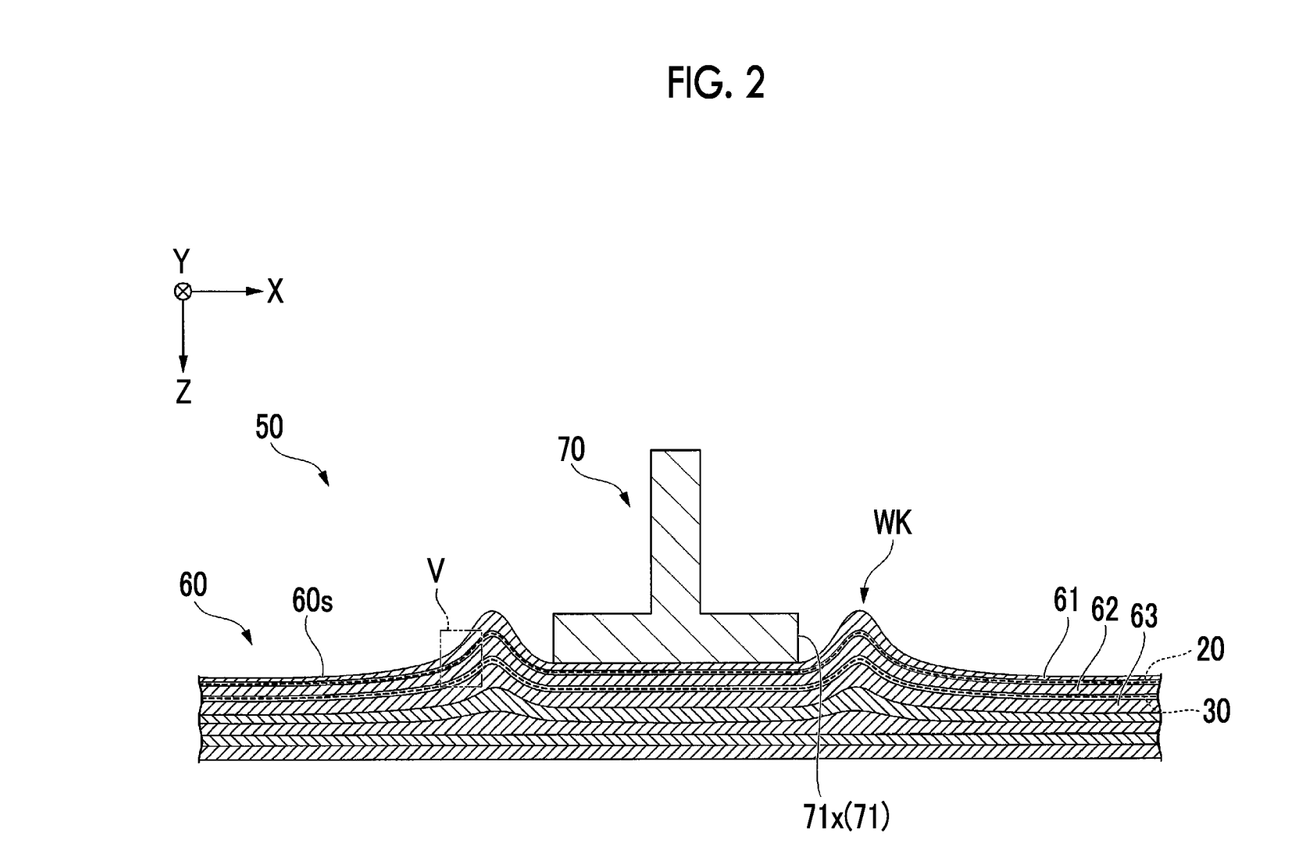
FIG. 2 is a sectional view taken along line II-II of FIG. 1.

As shown in FIG. 2, the reinforced member 60 has a first composite layer 61, a second composite layer 62, and a third composite layer 63 in order in a Z direction from the surface 60s side. Each of the first composite layer 61, the second composite layer 62, and the third composite layer 63 is a prepreg in which a thermosetting resin is impregnated into carbon fibers, and is sequentially laminated.

Further, in this embodiment, the reinforcing member 70 is a stringer.

Returning to FIG. 1, the reinforcing member 70 extends in one direction. Specifically, the reinforcing member 70 extends longer in the direction along a Y direction than in the direction along an X direction.

Hereinafter, in the reinforcing member 70, the direction along the X direction is also referred to as a width direction, and the direction along the Y direction is also referred to as a depth direction. Further, in the reinforcing member 70 or the reinforced member 60, the direction along the Z direction is also referred to as a height direction.

The reinforcing member 70 is bonded onto the surface 60s of the reinforced member 60. The surface 60s of the reinforced member 60 and the reinforcing member 70 are co-bonded by bonding the cured reinforcing member 70 to the surface 60s of the reinforced member 60 that is a raw material (uncured).

The reinforcing member 70 has peripheral edge portions 71 on both sides in the width direction and both sides in the depth direction. The peripheral edge portions 71 include a pair of width peripheral edge portions 71x extending in the depth direction on both sides in the width direction of the reinforcing member 70, and a pair of depth peripheral edge portions 71y extending in the width direction on both sides in the depth direction of the reinforcing member 70. The width peripheral edge portion 71x extends longer than the depth peripheral edge portion 71y.

(Configuration of Optical Fiber)

As shown in FIG. 2, the first optical fiber 20 extends between the first composite layer 61 and the second composite layer 62.

The second optical fiber 30 extends between the second composite layer 62 and the third composite layer 63 along the first optical fiber 20.

In this embodiment, the first optical fiber 20 and the second optical fiber 30 are provided when the first composite layer 61, the second composite layer 62, and the third composite layer 63 are laminated.

Therefore, the surface 60s of the reinforced member 60 and the reinforcing member 70 are co-bonded in a state where the first optical fiber 20 is provided between the first composite layer 61 and the second composite layer 62 and the second optical fiber 30 is provided between the second composite layer 62 and the third composite layer 63.

In this embodiment, as shown in FIG. 2, as a composite layer, only the second composite layer 62 is formed between the first optical fiber 20 and the second optical fiber 30. However, as a modification example, in addition to the second composite layer 62, another composite layer may be included between the first optical fiber 20 and the second optical fiber 30.

Further, in this embodiment, as shown in FIG. 2, as a composite layer, only the first composite layer 61 is formed on the first optical fiber 20. However, as a modification example, in addition to the first composite layer 61, another composite layer may be included on the first optical fiber 20.

Each of the first optical fiber 20 and the second optical fiber 30 intersects at least a part of the peripheral edge portion 71 of the reinforcing member 70. Specifically, as shown in FIG. 1, each of the first optical fiber 20 and the second optical fiber 30 meanders over the both sides in the width direction of the reinforcing member 70 so as to repeatedly intersect the pair of width peripheral edge portions 71x among the peripheral edge portions 71 of the reinforcing member 70.

(Configuration of Shape Acquisition Unit)

The configuration of the shape acquisition unit 40 will be described in detail.

Figure 3:
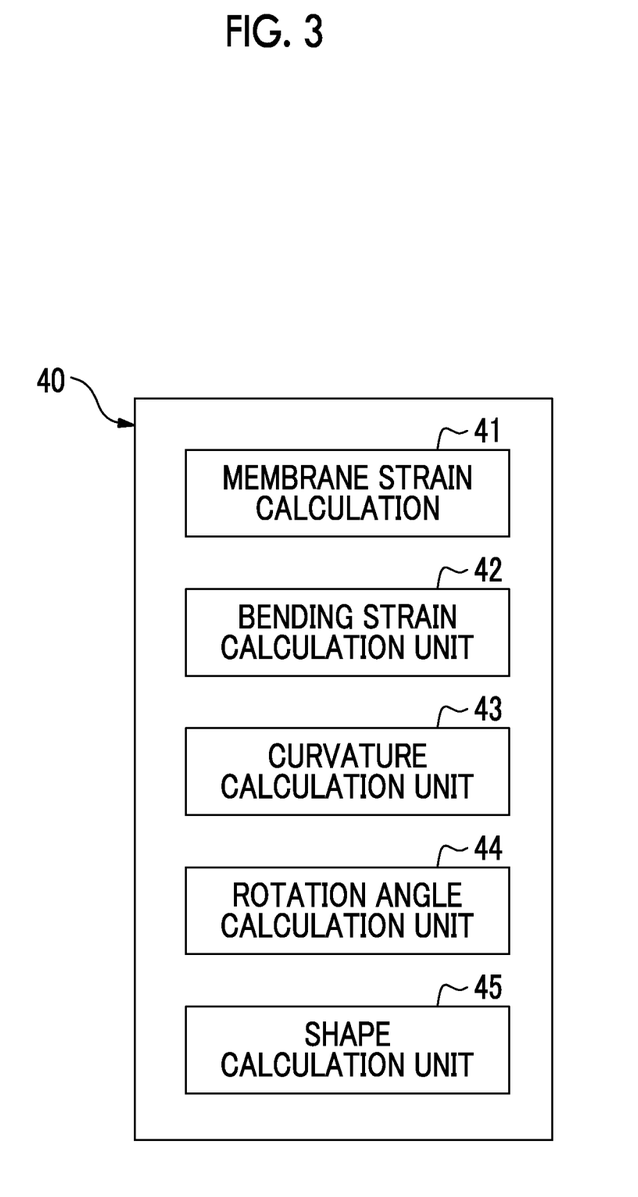
FIG. 3 is a block diagram of a shape acquisition unit according to the embodiment.

As shown in FIG. 3, the shape acquisition unit 40 functionally includes a membrane strain calculation unit 41, a bending strain calculation unit 42, a curvature calculation unit 43, a rotation angle calculation unit 44, and a shape calculation unit 45.

The membrane strain calculation unit 41 acquires a membrane strain $\varepsilon a$ by calculation from a first strain $\varepsilon 1$ and a second strain $\varepsilon 2$, which are strains at the respective positions in the first strain distribution and the second strain distribution.

The bending strain calculation unit 42 acquires a bending strain $\varepsilon b$ by calculation from the first strain $\varepsilon 1$ and the second strain $\varepsilon 2$, which are strains at the respective positions in the first strain distribution and the second strain distribution.

The curvature calculation unit 43 acquires a curvature $\phi$ of the surface 60s at each position by calculation.

The rotation angle calculation unit 44 acquires a rotation angle $\theta$ of the surface 60s at each position by calculation.

The shape calculation unit 45 acquires the shape of the wrinkle WK by accumulating the rotation angle $\theta$ of the surface 60s at each position.

Each calculation for acquiring the shape of the wrinkle WK in the shape acquisition unit 40 will be described in detail with reference to FIGS. 4 to 6.

The shape acquisition unit 40 acquires the shape of the wrinkle WK on the surface 60s of the reinforced member from the first strain distribution and the second strain distribution.

Figure 4:
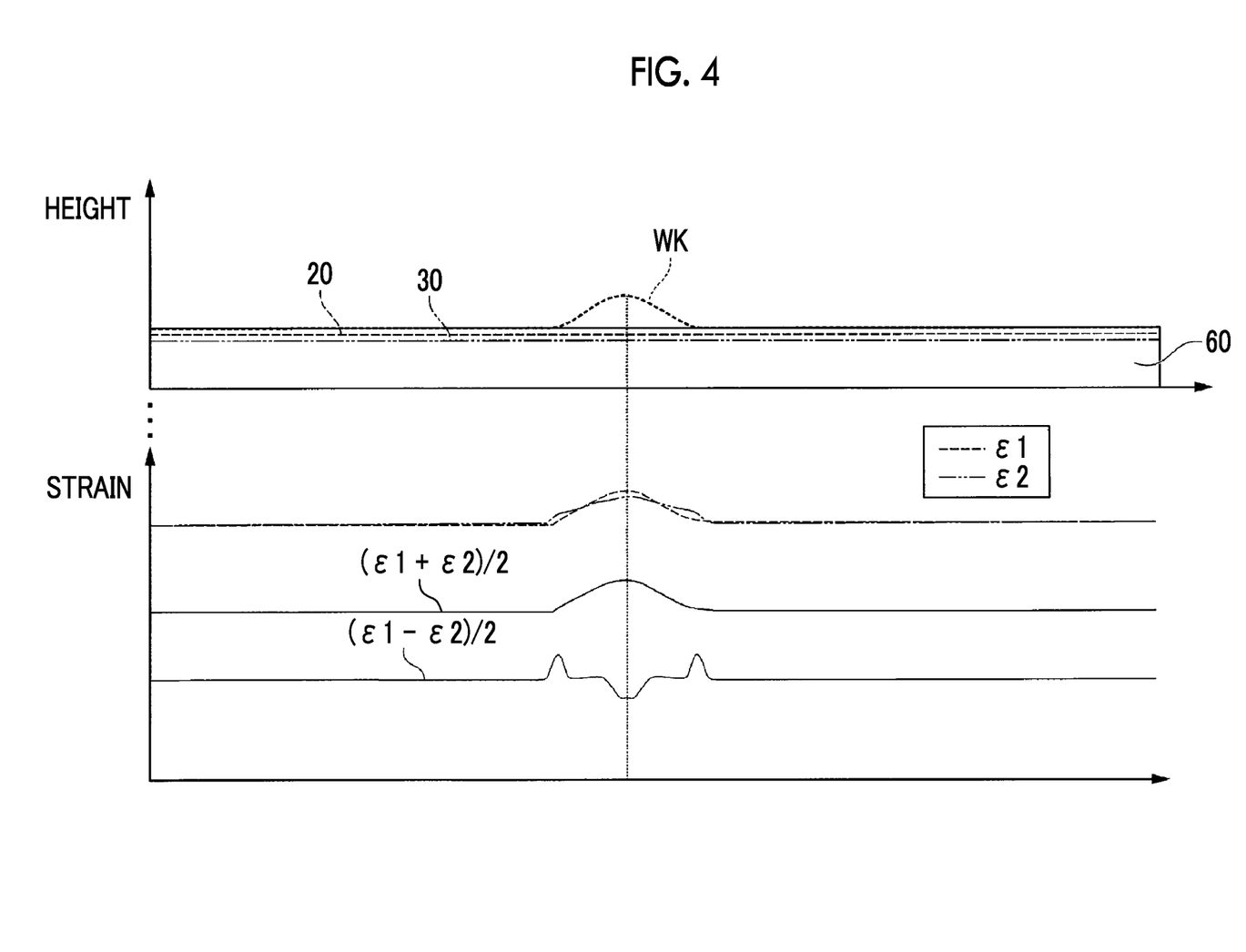
FIG. 4 is a diagram showing a relationship between a strain and a height distribution at each position.

As shown in FIG. 4, if the wrinkle WK occurs, the first strain $\varepsilon 1$ and the second strain $\varepsilon 2$ respectively generate in the first optical fiber 20 and the second optical fiber 30.

Figure 5:
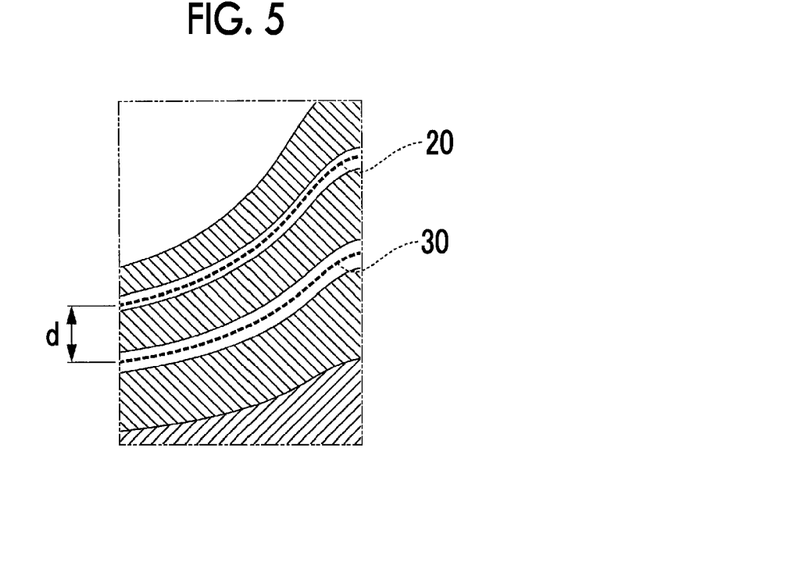
FIG. 5 is an enlarged view of a portion V in FIG. 2.

At this time, for example, in the portion shown in FIG. 5, the relationship of the second strain $\varepsilon 2$>the first strain $\varepsilon 1$ is established. In this case, the membrane strain (axial direction strain) sa of the second composite layer 62 can be calculated from $\varepsilon a=(\varepsilon 2+\varepsilon 1)/2$, and the bending strain $\varepsilon b$ can be calculated from $\varepsilon b=(\varepsilon 2-\varepsilon 1)/2$.

By these calculations, the membrane strain calculation unit 41 and the bending strain calculation unit 42 respectively acquire the membrane strain $\varepsilon a$ and the bending strain $\varepsilon b$.

When the position resolution in the X direction that can be measured by the measurement unit 10 is set to be $\Delta x$ and the distance between the first optical fiber 20 and the second optical fiber 30 is set to be d, the curvature $\phi$ of the surface 60s at the location in a measurement range $\Delta x$ can be calculated from $\varepsilon b/(d/2)=\phi$. Further, the rotation angle $\theta$ of the surface 60s at the location in the measurement range $\Delta x$ can be calculated from $\phi \times \Delta x=\theta$.

By these calculations, the curvature calculation unit 43 and the rotation angle calculation unit 44 respectively acquire the curvature $\phi$ and the rotation angle $\theta$.

In a case where only $\varepsilon a$ is calculated in the entire measurement range $\Delta x$ and $\varepsilon b$ is almost zero, the measurement range $\Delta x$ can be regarded as a region where bending deformation does not occur.

In contrast, the point at which $\varepsilon b$ starts to increase can be evaluated as the end of the range in which the wrinkle WK occurs. Further, the inclination of each measurement range $\Delta x$ is obtained by calculating the rotation angle $\theta$ in the continuous measurement range $\Delta x$, and therefore, by calculating the cumulative value of the inclination in each measurement range $\Delta x$, the shape calculation unit 45 acquires the shape in the height direction of the wrinkle WK.

Figure 6:
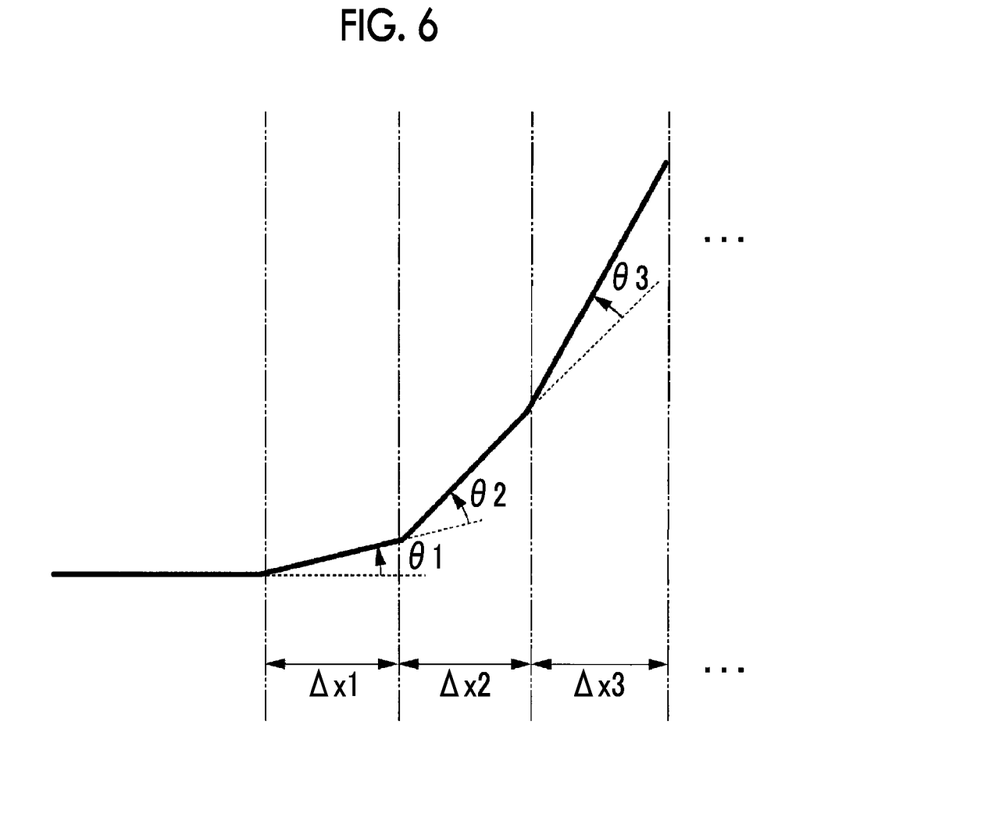
FIG. 6 is a diagram showing a relationship between a rotation angle and a wrinkle distribution shape.

For example, as shown in FIG. 6, by accumulating the rotation angles $\theta 1, \theta 2, \theta 3, \ldots$, in each of the measurement ranges $\Delta x1, \Delta x2, \Delta x3, \ldots$, the shape calculation unit 45 can acquires the shape of the wrinkle WK.

(Evaluating Method)

Figure 7:
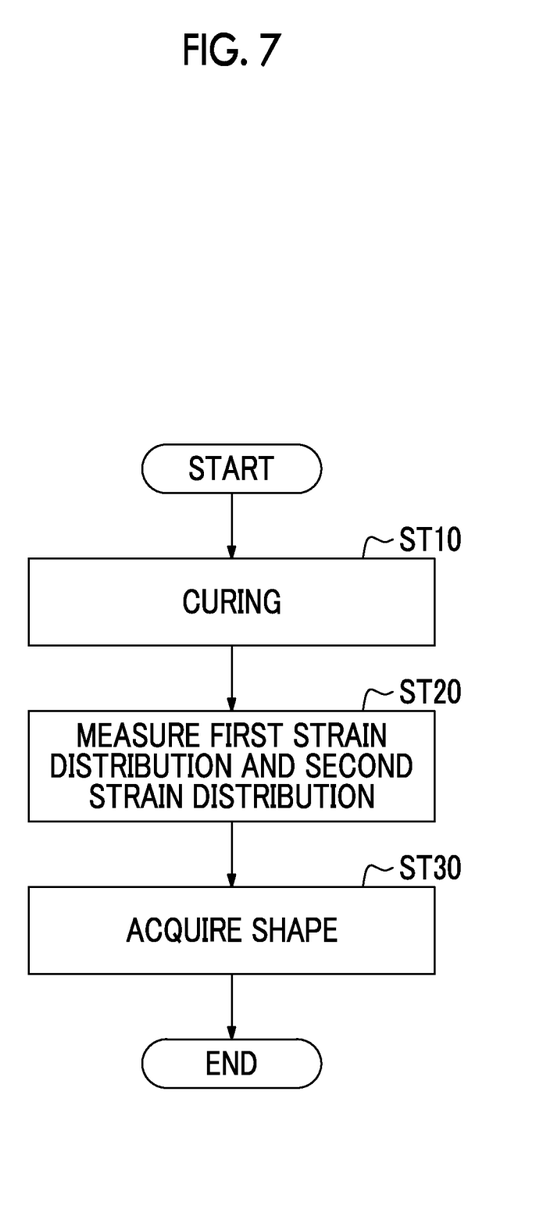
FIG. 7 is a flowchart of an evaluating method according to the embodiment.

An evaluating method by the evaluation system 1 of this embodiment will be described with reference to FIG. 7.

In this evaluating method, the shape of the wrinkle WK which is generated on the surface 60s after the curing of the reinforced member 60 which is a raw material is evaluated.

First, the cured reinforcing member 70 is placed on the surface 60s, and the reinforced member 60 which is a raw material (uncured) provided with the first optical fiber 20 and the second optical fiber 30 is cured (ST10: curing step). In this way, the cured reinforcing member is co-bonded to the surface 60s. At this time, as shown in FIG. 2, there is a case where the wrinkles WK are generated on the surface 60s.

Subsequently, the first strain distribution which is a distribution of a strain at each position in the axial direction of the first optical fiber 20 is measured, and the second strain distribution which is a distribution of a strain at each position in the axial direction of the second optical fiber 30 is measured (ST20: measuring step).

Subsequently, the shape of the wrinkle WK on the surface 60s of the reinforced member 60 is acquired from the first strain distribution and the second strain distribution (ST30: step of acquiring the shape).

(Operation and Effects)

In this embodiment, as optical fibers, the first optical fiber 20 and the second optical fiber 30 are embedded between the respective layers of the first composite layer 61, the second composite layer 62, and the third composite layer 63 where the wrinkle WK is generated, and the strain after curing is measured.

By embedding the first optical fiber 20 and the second optical fiber 30 between the respective layers, the amount of deformation can be grasped, and the shape of the wrinkle WK can be evaluated.

By grasping the relative relationship between the strain value and the magnitude of the wrinkle WK in advance, there is also a case where it is possible to evaluate the shape of the wrinkle WK from a strain in one layer. However, the degree of accuracy is not very good.

In contrast, in the embodiment, since the shape of the wrinkle WK is evaluated from each strain between the two layers, the shape of the wrinkle WK can be acquired with a higher degree of accuracy.

Further, in this embodiment, each of the first optical fiber 20 and the second optical fiber 30 meanders over both sides in the width direction of the reinforcing member 70. In this way, the first optical fiber 20 and the second optical fiber 30 are distributed over the entire region where the reinforcing member 70 is bonded.

If it is not possible to grasp where and how large wrinkle WK has occurred, it is necessary to use an excessively safe allowable value and design value from visual inspection data of a picked-up location.

In contrast, in this embodiment, the first optical fiber 20 and the second optical fiber 30 are distributed over the entire region where the reinforcing member 70 is bonded, whereby it is possible to perform the entire surface inspection, and it is possible to grasp where and how large wrinkle WK has occurred. In this way, it is possible to specify a location where the wrinkle WK has not occurred.

Therefore, the strength design value of the location where the wrinkle WK has not occurred can be utilized to the maximum.

In this embodiment, the measurement unit 10 measures the strain distribution at each position in the axial direction of the first optical fiber 20 and the second optical fiber 30 by introducing incident light into the first optical fiber 20 and the second optical fiber 30 and detecting outgoing light from the first optical fiber 20 and the second optical fiber 30. However, the strain distribution may be measured in any manner.

Figure 8:
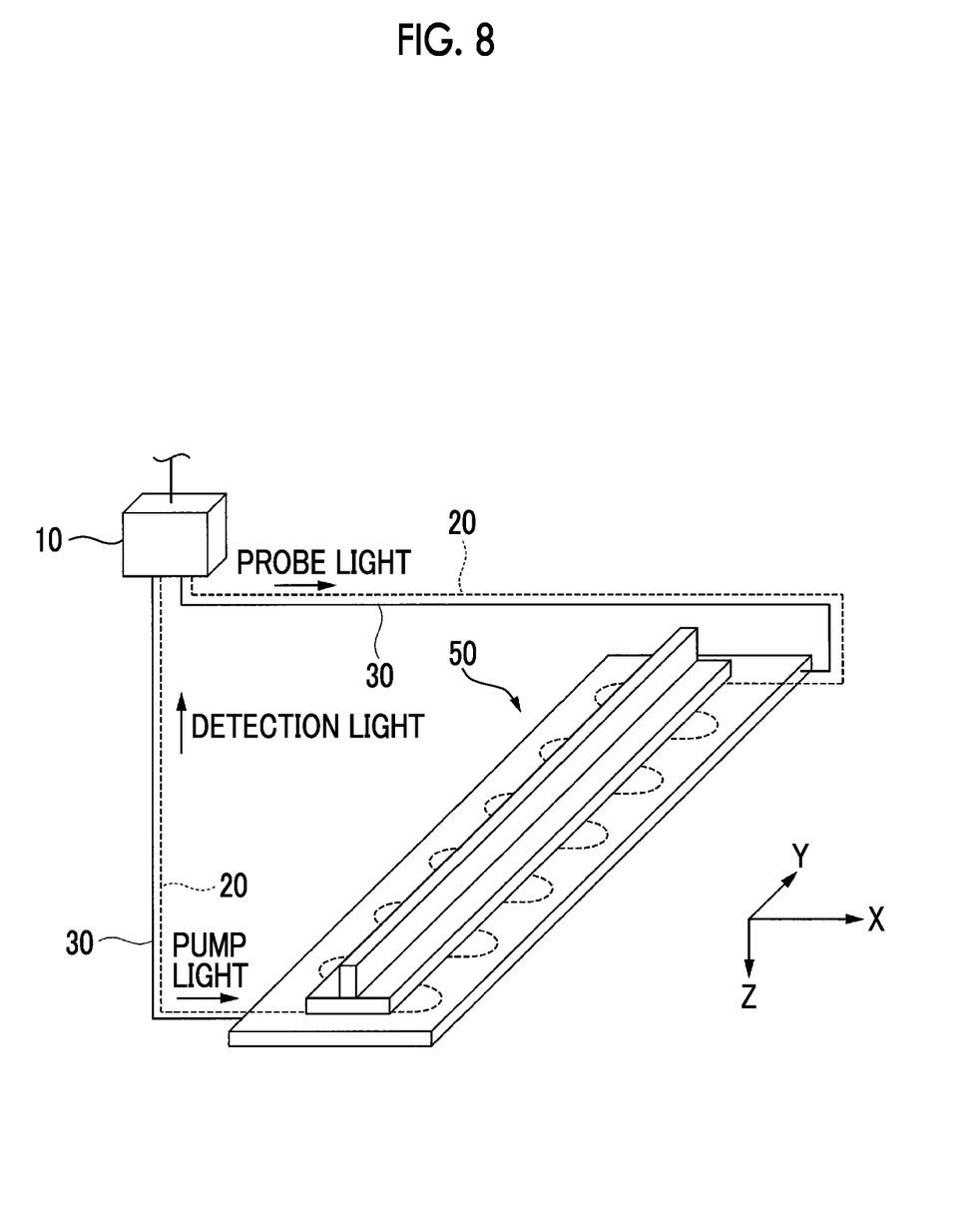
FIG. 8 is a diagram showing an example of a measurement unit according to the embodiment.

For example, the measurement unit 10 as shown in FIG. 8 may be used as the measurement unit 10 that measures the strain distribution at each position in the axial direction of the first optical fiber 20 and the second optical fiber 30.

The measurement unit 10 shown in FIG. 8 is a measurement unit that uses BOCDA (Brillouin optical correlation region analysis method, refer to Japanese Patent No. 4652309).

In the measurement unit 10 using BOCDA, another light (probe light) whose frequency is shifted is introduced from the other end of each of the first optical fiber 20 and the second optical fiber 30 to weak backscattered light which is generated by introducing incident light (pump light) from one end of each of the first optical fiber 20 and the second optical fiber 30. Then, the measurement unit 10 detects stimulated Brillouin scattered light SBS (Stimulated Brillouin Scattering) as detection light by the interaction between the pump light and the probe light. Due to the shift of the optical spectrum of the SBS, the measurement unit 10 can detect the strain which is provided to the first optical fiber 20 at each position in the axial direction. Similarly, due to the shift of the optical spectrum of the SBS, the measurement unit 10 can detect the strain which is provided to the second optical fiber 30 at each position in the axial direction.

In the case of the measurement unit 10 shown in FIG. 8, by modulating the frequency and intensity of each incident light, it is possible to specify the location of the SBS to be measured, and the measurement unit 10 can measure the first strain distribution which is a strain at each position in the axial direction of the first optical fiber.

Similarly, by modulating the frequency and strength of each incident light, the measurement unit 10 can measure the second strain distribution which is a strain at each position in the axial direction of the second optical fiber 30.

Figure 9:
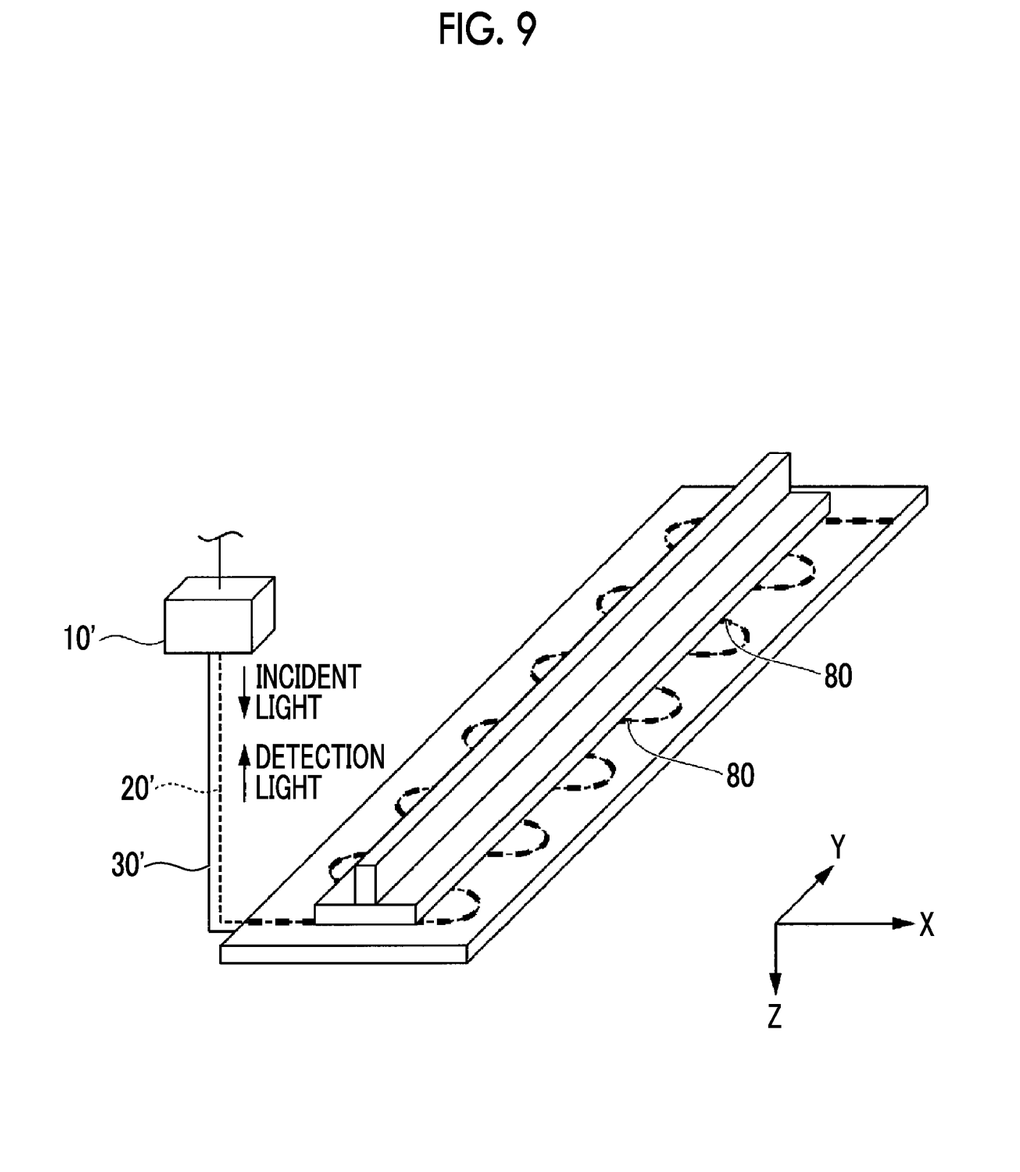
FIG. 9 is a diagram showing another example of the measurement unit according to the embodiment.

Further, instead of the measurement unit 10 that measures the strain distribution at each position in the axial direction of the optical fiber, the first optical fiber 20, and the second optical fiber 30, a measurement unit 10', a first optical fiber 20', and a second optical fiber 30', as shown in FIG. 9, may be used.

The measurement unit 10' shown in FIG. 9 is a measurement unit that uses FBG (Fiber Bragg Grating).

In the measurement unit 10' using the FBG, incident light is introduced from one end of the first optical fiber 20' in which a diffraction grating (Bragg Grating) that reflects light having a different specific wavelength is provided at each position in the axial direction. The incident light is separated into back reflected light and transmitted light by the diffraction grating 80. The measurement unit 10' can measure the first strain distribution which is a strain at each diffraction grating 80, that is, a strain at each position, by detecting the back reflected light or the transmitted light as a detection light and measuring the optical spectrum or the peak frequency fluctuation of the back reflected light or the transmitted light.

Similarly, in the measurement unit 10' using the FBG, incident light is introduced from one end of the second optical fiber 30' in which the diffraction grating 80 that reflects light having a different specific wavelength is provided at each position in the axial direction. The measurement unit 10' can measure the second strain distribution which is a strain at each diffraction grating 80, that is, a strain at each position, by detecting the back reflected light or the transmitted light as a detection light and measuring the optical spectrum or the peak frequency fluctuation of the back reflected light or the transmitted light.

Modification Example

In the above embodiment, the first optical fiber is provided between the first composite layer and the second composite layer, and the second optical fiber is provided between the second composite layer and the third composite layer.

As a modification example, a configuration may be adopted in which with respect to a reinforced member having a first composite layer, a second composite layer, a third composite layer, and a fourth composite layer in order, a third strain distribution is measured by further providing a third optical fiber between the third composite layer and the fourth composite layer and the shape of the wrinkle on the surface of the reinforced member is acquired from the first strain distribution, the second strain distribution, and the third strain distribution.

As another modification example, a configuration may be adopted in which the number of fibers is further increased and the shape of the wrinkle on the surface of the reinforced member is acquired from more strain distributions.

In the above embodiment, each of the first optical fiber and the second optical fiber intersects the width peripheral edge portion 71*x*. As a modification example, the first optical fiber and the second optical fiber may further intersect the depth peripheral edge portion 71*y*, in addition to the width peripheral edge portion 71*x*. If the first optical fiber and the second optical fiber intersect the depth peripheral edge portion 71*y*, the shape of the wrinkle WK which is generated around the depth peripheral edge portion 71*y* can also be acquired.

In the above embodiment, in the shape acquisition unit 40, the shape of the wrinkle WK on the surface 60*s* of the reinforced member 60 is acquired by performing calculation on the first strain distribution and the second strain distribution by various calculation units. However, the shape of the wrinkle WK on the surface 60*s* may be acquired without performing calculation in the various calculation units.

As a modification example, the shape acquisition unit 40 may store the shape of the wrinkle WK with respect to each of various first and second strain distributions in advance. In this case, the shape acquisition unit 40 reads the shape of the wrinkle WK on the surface 60*s* with respect to the measured first and second strain distributions from among the stored shapes of the plurality of wrinkles WK, and acquires the shape of the wrinkle WK on the surface 60*s*.

In each of the embodiments described above, a program for realizing various functions of the shape acquisition unit may be recorded on a computer-readable recording medium, and the program recorded on the recording medium may be read into a computer system and executed by the computer system, thereby performing various processes. Here, the processes of various processes at a CPU of the computer system are stored in the computer-readable recording medium in the form of a program, and a computer reads and executes this program, whereby the various processes are performed. Further, the computer-readable recording medium refers to a magnetic disk, a magneto-optical disk, a CD-ROM, a DVD-ROM, a semiconductor memory, or the like. Further, the computer program may be distributed to a computer through a communication line, and the computer that has received the distribution may execute the program.

Some embodiments of the present invention have been described above. However, these embodiments have been presented as examples and are not intended to limit the scope of the invention. These embodiments can be implemented in other various forms, and various omissions, replacements, and changes can be made within a scope which does not depart from the gist of the invention. These embodiments or modifications thereof are included in the scope or gist of the invention and are also included in the inventions described in the claims and equivalents thereof.

INDUSTRIAL APPLICABILITY

According to the aspects described above, it is possible to evaluate a wrinkle.

REFERENCE SIGNS LIST

1: evaluation system
10: measurement unit
10': measurement unit
20: first optical fiber
20': first optical fiber
30: second optical fiber
30': second optical fiber
40: shape acquisition unit
41: membrane strain calculation unit
42: bending strain calculation unit
43: curvature calculation unit
44: rotation angle calculation unit
45: shape calculation unit
50: assembly
60: reinforced member
60s: surface
61: first composite layer
62: second composite layer
63: third composite layer
70: reinforcing member
71: peripheral edge portion
71x: width peripheral edge portion
71y: depth peripheral edge portion
80: diffraction grating
WK: wrinkle
Δx: measurement range
θ: rotation angle

The invention claimed is:

1. An evaluating method for evaluating an assembly provided with a reinforced member having a first composite layer, a second composite layer, and a third composite layer in order, and a reinforcing member fixed to a surface of the reinforced member, the method comprising:
   measuring a first strain distribution that is a distribution of a first strain at each position in an axial direction of a first optical fiber extending between the first composite layer and the second composite layer by introducing incident light into the first optical fiber and detecting outgoing light from the first optical fiber, and measuring a second strain distribution that is a distribution of a second strain at each position in an axial direction of a second optical fiber extending between the second composite layer and the third composite layer along the first optical fiber by introducing incident light into the second optical fiber and detecting outgoing light from the second optical fiber; and
   acquiring a shape of a wrinkle on the surface of the reinforced member based on the first strain distribution and the second strain distribution.

2. The evaluating method according to claim 1, wherein the reinforcing member has a peripheral edge portion, and
   each of the first optical fiber and the second optical fiber intersects at least a part of the peripheral edge portion.

3. The evaluating method according to claim 2, wherein the reinforcing member is a stringer extending in one direction, and
   the first optical fiber and the second optical fiber intersect at least a part of an edge portion extending in the one direction in the peripheral edge portion.

4. The evaluating method according to claim 1, wherein the first optical fiber and the second optical fiber meander over both sides of the reinforcing member.

5. An evaluation system that evaluates an assembly provided with a reinforced member having a first composite layer, a second composite layer, and a third composite layer in order, and a reinforcing member fixed to a surface of the reinforced member, the system comprising:
   a measurement unit including a light source configured to irradiate incident light and a light detector configured to detect outgoing light;
   a memory configured to store instructions; and
   a processor configured to execute the instructions, wherein
   a measurement unit is configured to measure a first strain distribution that is a distribution of a first strain at each position in an axial direction of a first optical fiber extending between the first composite layer and the second composite layer by introducing the incident light into the first optical fiber and detecting the outgoing light from the first optical fiber, and to measure a second strain distribution that is a distribution of a second strain at each position in an axial direction of a second optical fiber extending between the second composite layer and the third composite layer along the first optical fiber by introducing the incident light into the second optical fiber and detecting the outgoing light from the second optical fiber; and
   the processor is configured to execute the instructions to acquire a shape of a wrinkle on the surface of the reinforced member based on the first strain distribution and the second strain distribution.

6. The evaluating method according to claim 1, wherein a membrane strain and a bending strain are acquired based on the first strain and the second strain.

7. The evaluating method according to claim 1, wherein the shape in a height direction of the wrinkle is acquired.

* * * * *